United States Patent [19]

Dambach

[11] Patent Number: 5,783,990

[45] Date of Patent: Jul. 21, 1998

[54] METHOD OF DETECTING AND DOCUMENTING EXHAUST-GAS RELEVANT MALFUNCTIONS OF A VEHICLE HAVING AN INTERNAL COMBUSTION ENGINE UTILIZING ONBOARD MEANS

[75] Inventor: Dieter-Andreas Dambach, Korntal-Münchingen, Germany

[73] Assignee: Robert Bosch GmbH, Stuttgart, Germany

[21] Appl. No.: 806,412

[22] Filed: Feb. 26, 1997

[30] Foreign Application Priority Data

Feb. 28, 1996 [DE] Germany ............. 196 07 461.4

[51] Int. Cl.$^6$ ............................................. B60Q 1/00
[52] U.S. Cl. ............. 340/438; 340/439; 340/451; 340/459; 123/690; 701/108
[58] Field of Search ............. 340/438, 450.2, 340/439, 450, 459, 460, 461, 451; 123/690, 676; 701/103, 101, 29, 109, 108

[56] References Cited

U.S. PATENT DOCUMENTS

| | | | |
|---|---|---|---|
| 4,280,358 | 7/1981 | Henderson | 340/439 |
| 4,344,136 | 8/1982 | Panik | 340/459 |
| 4,413,248 | 11/1983 | Staerzl | 340/459 |
| 5,325,082 | 6/1994 | Rodriguez | 340/438 |
| 5,462,034 | 10/1995 | Kadota | 123/520 |
| 5,506,773 | 4/1996 | Takaba et al. | 364/424.03 |
| 5,696,676 | 12/1997 | Takaba | 340/438 |

*Primary Examiner*—Jeffery A. Hofsass
*Assistant Examiner*—Anh La
*Attorney, Agent, or Firm*—Walter Ottesen

[57] ABSTRACT

The invention is directed to a method of detecting and documenting exhaust-gas relevant malfunctions of a vehicle equipped with an internal combustion engine utilizing onboard equipment. Malfunctions are detected by a sensor device and evaluated in a circuit unit. The malfunction is displayed by a warning lamp (fault announcement) and is stored in a fault memory. A pressure measurement in the fuel loop is made and the output as well as the storage of the fault announcement is made in dependence upon the measured pressure. This is done to differentiate fault announcements based on a fuel tank run to empty.

8 Claims, 1 Drawing Sheet

METHOD OF DETECTING AND DOCUMENTING EXHAUST-GAS RELEVANT MALFUNCTIONS OF A VEHICLE HAVING AN INTERNAL COMBUSTION ENGINE UTILIZING ONBOARD MEANS

BACKGROUND OF THE INVENTION

The California Environmental Authority (CARB) as well as United States federal regulations require the detection and documentation of exhaust-gas relevant malfunctions of a motor vehicle having an internal combustion engine utilizing onboard diagnostic means.

It is known, to detect malfunctions with sensor means and to evaluate the malfunctions in a circuit unit and then indicate the same via a warning lamp (malfunction indicator lamp, MIL). The warning lamp is mounted in the viewing field of the driver and indicates to the driver that a visit to a service station should be made. At the same time, a malfunction so detected is stored in an electronic fault memory.

The detection, display and documentation of malfunctions, which are caused by improper operation by the person driving the vehicle, are problematical.

For example, one such improper operation is running the fuel tank to empty. In this case, the fuel pump sporadically pumps vapor instead of liquid. The necessary fuel metering to one or several cylinders of the engine can drop so greatly that combustion misfires occur. The uncombusted fuel is then afterburned with oxygen in the catalytic converter where the temperature of the catalytic converter increases significantly so that permanent damage to the converter can occur. Furthermore, with an empty tank, mixture deviations occur which can deteriorate the quality of the exhaust gas. It is understood that malfunctions of this kind are no longer present when the tank is filled because sufficient fuel is available in this case.

Temporary malfunctions of this kind caused by improper tanking can easily be obviated by the operator of the motor vehicle and must be differentiated from malfunctions which are based on a permanent defect of the vehicle system.

Furthermore, the detection and documentation of malfunctions, which are caused by improper operation, are significant because of possible liability claims or warranty claims on the vehicle manufacturer. Defects of the vehicle caused by faulty operation are the responsibility of the driver and not of the manufacturer.

Finally, the detection and documentation of such temporary malfunctions is also of significance for the maintenance of the vehicle because these temporarily occurring malfunctions do not constitute defects which must be eliminated by the personnel of the service station.

SUMMARY OF THE INVENTION

In view of the foregoing, it is an object of the invention to provide a method for detecting and documenting exhaust-gas relevant malfunctions of a vehicle having an internal combustion engine with the aid of onboard means of the kind mentioned above which makes it possible to differentiate malfunctions caused by a faulty operation of the vehicle from actual and permanently present defects of the vehicle system and to document such malfunctions.

The method of the invention is for detecting and documenting exhaust-gas relevant malfunctions of a vehicle having an internal combustion engine and onboard means which includes a control circuit. The method is carried out with the aid of the onboard means and includes the steps of: detecting the malfunctions utilizing detecting means and evaluating the malfunctions in the control circuit; providing a warning lamp to display the malfunctions as a fault announcement; measuring the pressure in the fuel loop with a pressure sensor and supplying a signal representing the pressure to the engine control circuit; evaluating the signal in the control circuit to separate out those malfunctions which are based on an empty fuel tank; and, outputting the malfunctions as fault announcements and storing the fault announcements in a fault memory in dependence upon the measured pressure.

It is especially advantageous that, for separating out fault announcements, which are based on an empty fuel tank, a pressure measurement in the fuel loop is made and that the output as well as the storage of the fault announcement takes place in dependence upon the measured pressure. In this way, a fault, which is based on an empty tank, can be detected and documented in a technically simple manner.

Preferably, a fault is always then displayed and stored when the detected pressure drops below a pregiven value.

In addition to the detection of the pressure in the fuel loop, it is possible to provide additional decision criteria for differentiating between technical malfunctions caused by equipment and malfunctions which are caused by a tank driven to empty. This can be achieved in that preferably combustion misfires and/or disturbances in the fuel supply system are detected as a malfunction and are displayed and stored. Combustion misfires of this kind caused by an empty tank and also mixture deviations can lead to damage of the catalytic converter as mentioned above.

In principle, it is possible to store these malfunctions in the fault memory as an additional error code to the error, which is detected on the basis of a pressure drop in the tank. However, it is especially advantageous that the detection (simultaneously or sequentially within a pregiven time interval) of combustion misfires and/or disturbances in the fuel supply system and of pressure drops in the fuel loop is stored in the fault memory as an additional error code (a combination of malfunctions such as "misfire detected with tank empty").

The detection of the pressure in the fuel loop can take place in very different ways. However, it is especially advantageous to make the measurement of pressure in the fuel loop by means of a pressure sensor mounted in the fuel feed line.

The pressure sensor itself can be a sensor having an analog output quantity or a contact switch.

In principle, it is possible to provide an additional circuit unit for the evaluation of the detected pressure and to provide an additional fault memory for storing the fault announcement in dependence upon the measured pressure. However, it is especially advantageous when the circuit unit as well as the fault memory are a part of the control circuit of the internal combustion engine, namely, the so-called engine control. In this way, an especially cost-effective detection of the fault announcement is possible because the engine control must only be slightly expanded or reprogrammed for the detection and storage of malfunctions of this kind.

BRIEF DESCRIPTION OF THE DRAWING

The invention will now be described with respect to the single FIGURE (FIG. 1) of the drawing which shows a schematic of an arrangement for detecting the pressure in the fuel loop of an internal combustion engine.

DESCRIPTION OF THE PREFERRED EMBODIMENTS OF THE INVENTION

Figure 1:
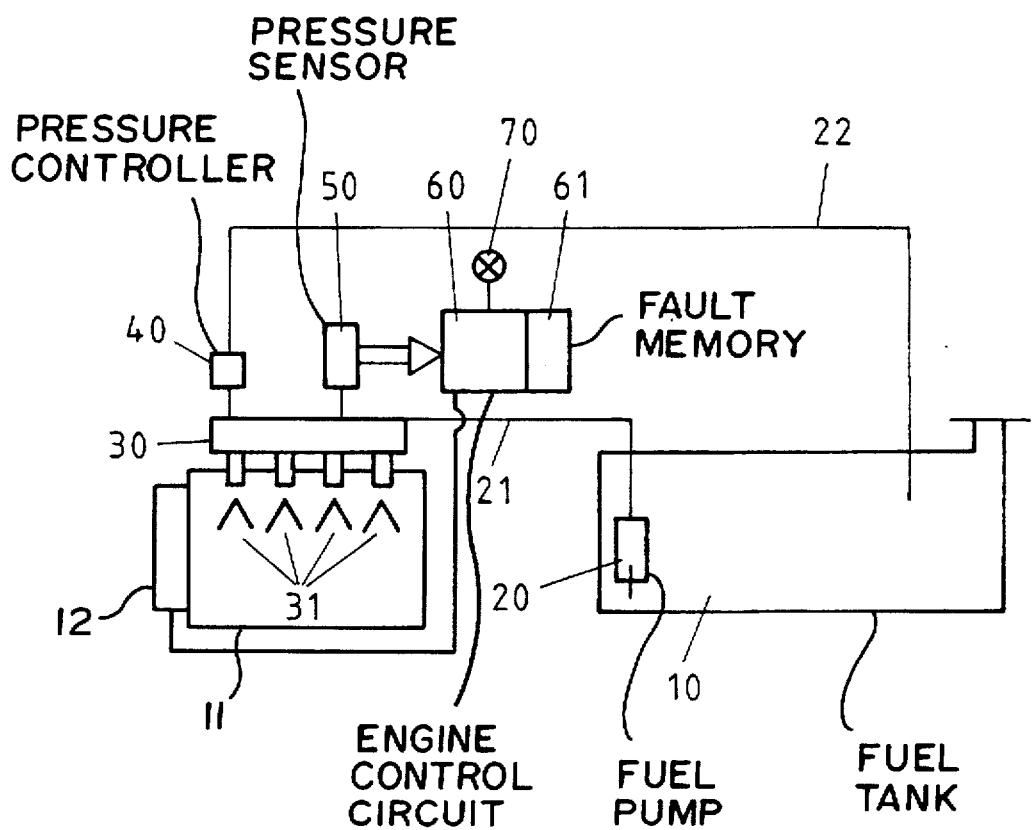

The basic idea of the invention is to differentiate fault announcements, which are based on an empty tank, from fault announcements, which are caused by technical defects, by providing a pressure measurement in the fuel loop and outputting as well as storing the fault announcement in dependence upon the measured pressure. The foregoing is in the context of a method of detecting and documenting exhaust-gas relevant malfunctions of a vehicle equipped with an internal combustion engine utilizing onboard means. Malfunctions are detected by sensor means, are evaluated in a circuit unit, are displayed via a warning light and are stored in a fault memory.

In this way, it is possible to document improper operation and to avoid unnecessary visits to a service station and to avoid an unnecessary search for technical defects which are not present.

The method of detecting and documenting exhaust-gas relevant malfunctions of a motor vehicle with an internal combustion engine with the aid of onboard means can best be explained in combination with the drawing which shows the detection of the pressure in the fuel loop by means of a pressure sensor.

As shown in the drawing, the fuel loop of a vehicle with an internal combustion engine 11 includes a tank 10 in which a fuel pump 20 is mounted. The fuel pump pumps fuel via a feed line 21 to a fuel distributor 30 having injection valves 31. A feedback line 22 runs from the fuel distributor 30 back to the fuel tank 10. A pressure controller 40 is mounted in the feedback line 22.

The pressure in the fuel loop is detected, for example, with a pressure sensor 50 mounted in the feed line 21 or on the fuel distributor 30. The pressure sensor 50 can be an analog pressure sensor known per se, or it can be a contact switch.

The signal detected by the pressure sensor 50 is transmitted to the control circuit 60 (engine control) of the internal combustion engine, which includes a fault memory 61. In the engine control circuit 60, the signal outputted by the pressure sensor is evaluated and a fault is indicated by a warning lamp 70 when the pressure drops below a pregiven value and is stored in a fault memory 61. The warning lamp is mounted in the viewing field of the driver. A drop in pressure is always then present when the fuel tank 10 is driven to empty. Then, instead of liquid, vapor is sporadically drawn by the fuel pump so that the pressure drops in the feed line 21 as well as in the fuel distributor 30.

In addition to this fault, combustion misfires and/or other disturbances in the fuel supply system can be detected simultaneously or within a pregiven time interval and stored as an additional error code in the fault memory 61 and, if required, be displayed via the warning lamp 70. For example, an appropriate detector 12 can be provided to detect malfunctions of the engine. A combination of the fault detected on the basis of a pressure drop with the fault detected and caused by combustion misfires and/or disturbances in the fuel supply system as an additional error code, for example, characterized by "combustion misfire based on tank run to empty" is especially advantageous. This additional error code makes possible the determination of combustion misfires based on a tank driven to empty, that is, an improper operation of the motor vehicle.

For diagnostic purposes, the fault memory 61 can be read out externally.

It is understood that the foregoing description is that of the preferred embodiments of the invention and that various changes and modifications may be made thereto without departing from the spirit and scope of the invention as defined in the appended claims.

What is claimed is:

1. A method of detecting and documenting exhaust-gas relevant malfunctions of a vehicle having an internal combustion engine and onboard means which includes a control circuit, the method being carried out with the aid of said onboard means and comprising the steps of:

detecting said malfunctions utilizing detecting means and evaluating said malfunctions in said control circuit;

switching on a warning lamp to display said malfunctions as a fault announcement;

measuring the pressure in the fuel loop with a pressure sensor and supplying a signal representing said pressure to said control circuit; and storing said fault announcement in a fault memory in dependence upon the measured pressure.

2. The method of claim 1, wherein a malfunction is always displayed by said warning lamp and stored in said fault memory when said pressure drops below a pregiven value.

3. The method of claim 2, wherein said vehicle further has a fuel supply system for said internal combustion engine, said method comprising the further steps of detecting combustion misfires and/or disturbances in the fuel supply system as an additional malfunction; and, displaying and storing said additional malfunctions.

4. The method of claim 3, further comprising the steps of:

storing the pressure drops within the fuel loop and the combustion misfires detected simultaneously or within pregiven time intervals as an additional fault code in said fault memory.

5. The method of claim 1, wherein the pressure in the fuel loop is measured with a pressure sensor mounted in the fuel feed of said fuel loop.

6. The method of claim 5, wherein said pressure sensor is a sensor having an analog output quantity or a contact switch.

7. The method of claim 1, wherein said engine includes an engine control arrangement and said control circuit is part of said control arrangement.

8. The method of claim 7, wherein said fault memory is part of said control arrangement and is adapted to be read out externally for diagnostic purposes.

* * * * *